United States Patent [19]

Snaper

[11] Patent Number: 4,590,999
[45] Date of Patent: May 27, 1986

[54] FIRE EXTINGUISHING SPRINKLER VALVE

[76] Inventor: Alvin A. Snaper, 2800 Cameo Cir., Las Vegas, Nev. 89107

[21] Appl. No.: 761,293

[22] Filed: Jul. 29, 1985

Related U.S. Application Data

[62] Division of Ser. No. 519,545, Aug. 2, 1983, abandoned.

[51] Int. Cl.⁴ ............................................. G05D 23/26
[52] U.S. Cl. ........................................ 169/37; 236/88
[58] Field of Search ................... 236/88; 169/19, 37, 169/41, 56

[56] References Cited

U.S. PATENT DOCUMENTS

| | | | |
|---|---|---|---|
| 2,232,502 | 2/1941 | Wittmann | 236/88 X |
| 2,233,659 | 3/1941 | Wittmann | 236/88 X |
| 2,339,087 | 1/1944 | Mantz | 236/88 X |
| 2,390,985 | 12/1945 | Boyer | 236/88 X |
| 2,601,579 | 6/1952 | Wittman | 236/88 |
| 2,678,774 | 5/1954 | Arvin | 236/88 X |
| 2,688,446 | 9/1954 | Wittmann | 236/88 |
| 4,361,275 | 11/1982 | Mori | 236/88 |

*Primary Examiner*—William E. Tapolcai
*Attorney, Agent, or Firm*—Donald D. Mon; David O'Reilly

[57] ABSTRACT

A thermal responsive valve having a temperature sensitive magnetic material for operating a valve in response to temperature variations. A valve is held closed by magnetic forces from mutually attractive magnetic means. One or more of the magnetic means are formed of materials that have strong magnetic properties producing magnetic forces which vary according to temperature. The magnetic materials are selected to provide a design temperature which when reached abruptly causes the material to lose its magnetic properties (permeability) becoming magnetically inert opening the valve. When the materials cools to the design temperature and below it abruptly retains its magnetic properties and will close the valve.

14 Claims, 11 Drawing Figures

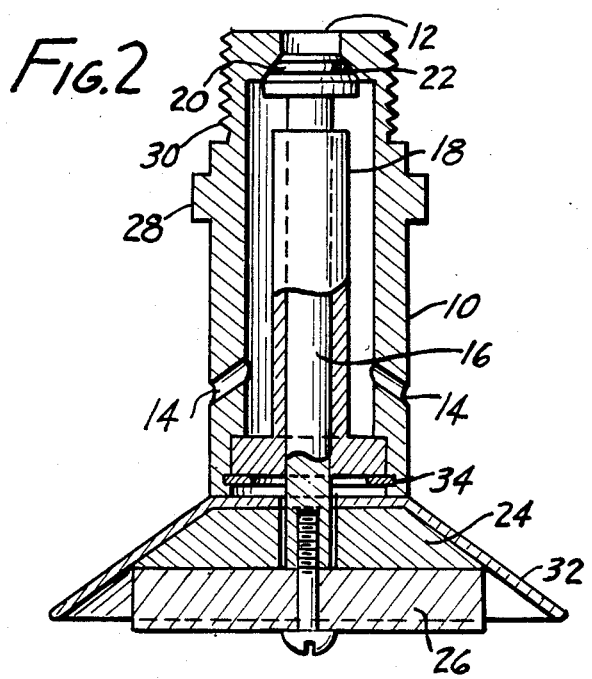
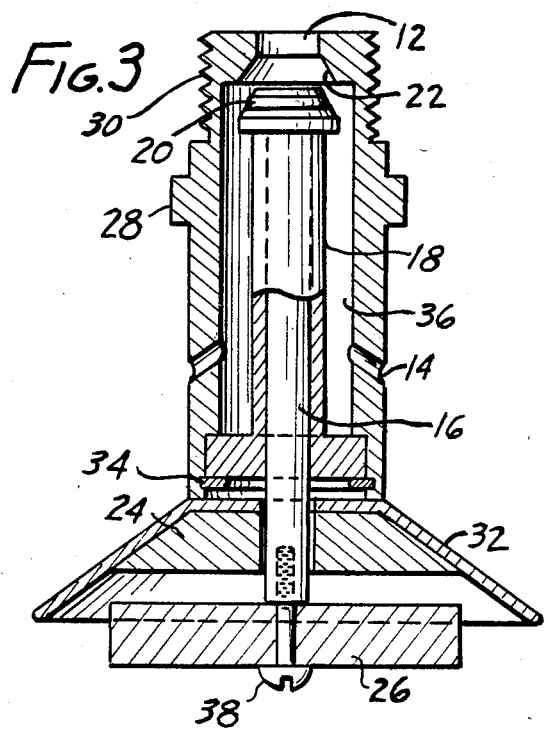
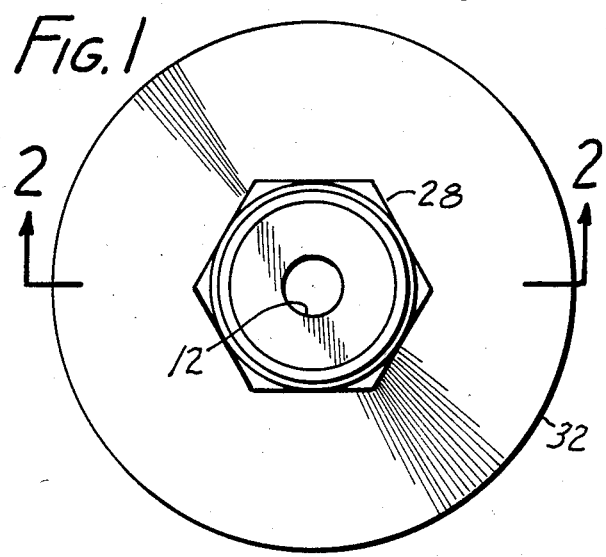
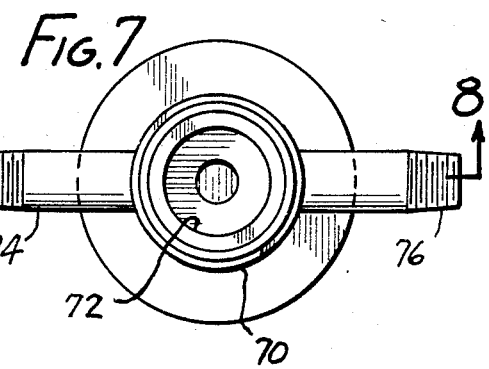
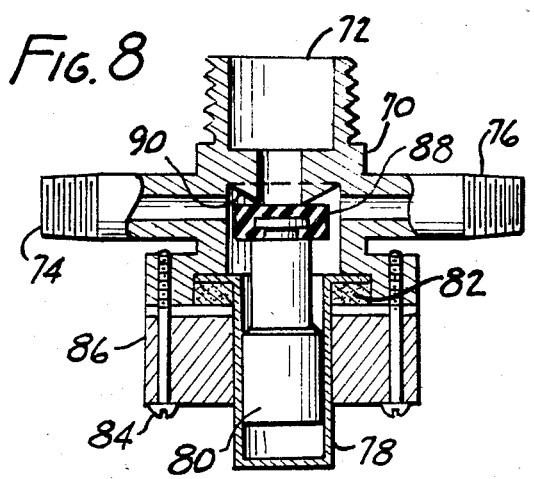
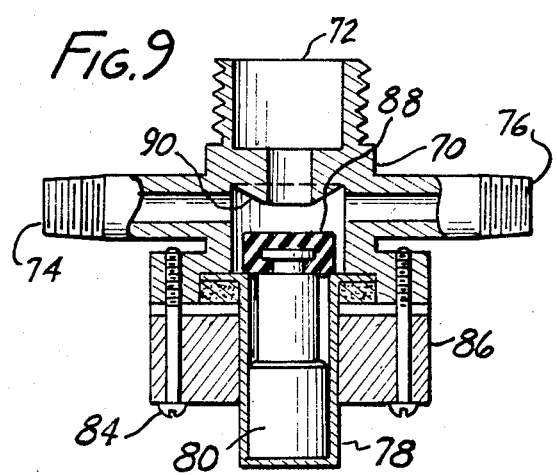

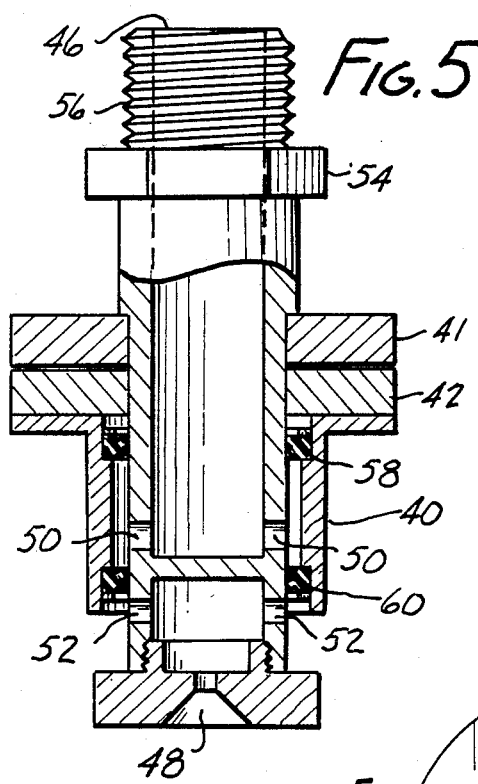
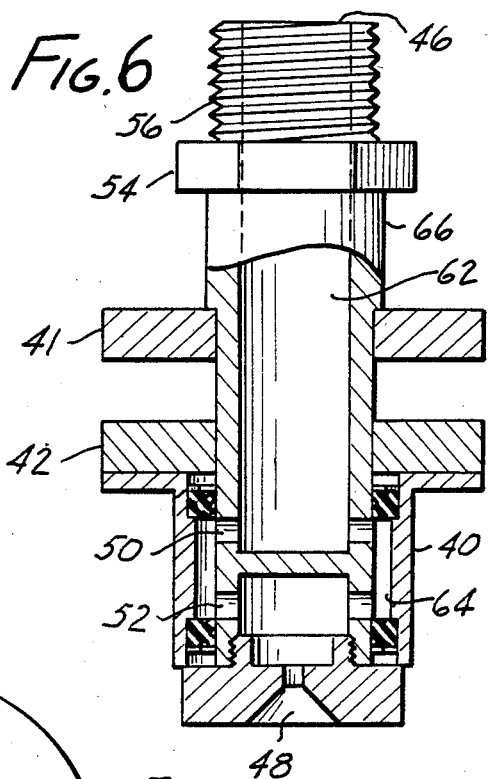
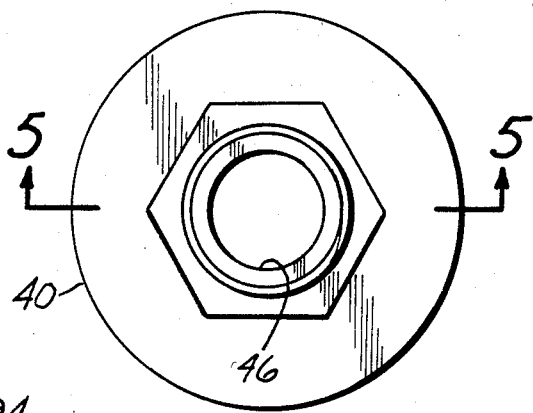
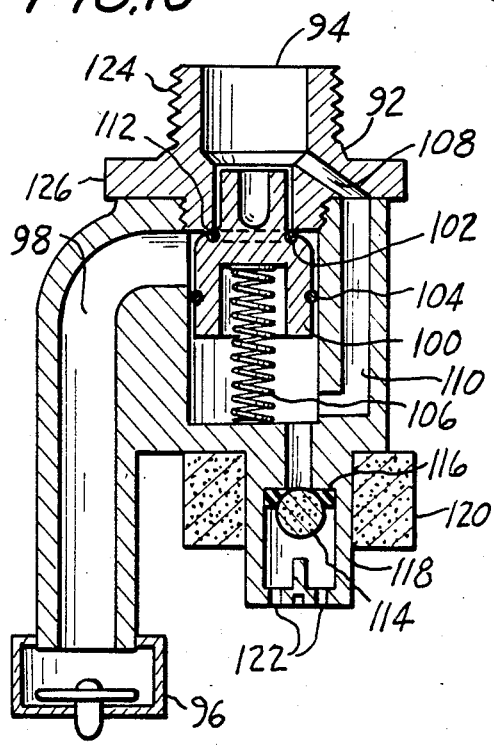
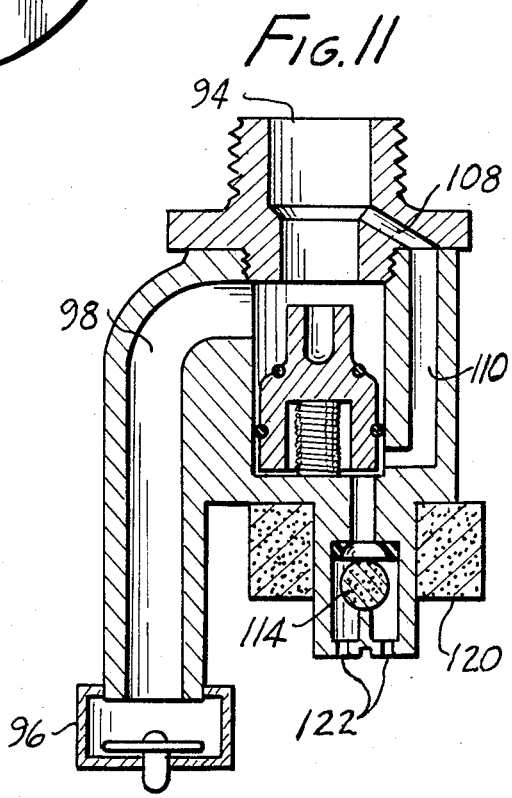

FIRE EXTINGUISHING SPRINKLER VALVE

This is a divisional of co-pending application Ser. No. 519,545 filed on Aug. 2, 1983 now abandoned.

FIELD OF THE INVENTION

This invention relates to temperature controlled valves and more particularly relates to a temperature controlled valve utilizing thermally responsive magnetic material.

BACKGROUND OF THE INVENTION

Temperature responsive devices, and particularly valves, are frequently used in the area of fire detection and control. For example, thermally responsive valves are used in sprinkler systems to put out fires. A difficulty with these types of valves however is that after putting out the fire the damage caused by a continuing flow of water can be substantial. Since statistics show that greater than 80% of fires occur during idle hours, a sprinkler system could put out a small fire and continue to run for a substantial period of time before discovered. Thus, while sprinklers do less damage than fires and fire hoses, they still cause large losses and unnecessary dollar loss because they do not turn themselves off. Further, if the sprinklers were accidentally discharged they would continue to run until someone turned them off. In use a standard sprinkler system will deliver only about one eighth of the amount of water per minute that a fire hose will, but nevertheless, the water damage over even a short period of time can still be substantial. It would be advantageous if some method were provided for the sprinkler system to turn off after extinguishing a fire.

There are a variety of methods available for providing thermally responsive devices for use in fire-sensing and sprinkler applications. Some of the techniques are used in combined sensor/actuator sevices such as a frangible glass bulb or a fusable link sprinkler, while others are sensor-only such as electronic temperature sensors or smoke detectors. Actuator only devices could be solenoid or pyrotechnic actuated valves. The most common technique used for sprinklers is the fusable link. These links contain metal alloys which melt rapidly at a predetermined temperature. The fusable link is used to secure a spring linkage under tension. When the alloy melts, the spring action is released, opening a water passage.

The frangible glass bulb technique is comprised of a high vapor pressure liquid and a small air bubble used as a strut to maintain a normally open water passage. When exposed to heat, the liquid expands, compressing the air bubble. When the bubble is completely absorbed, there is a rapid increase in pressure shattering the bulb and allowing water flow. The desired temperature rating is obtained by controlling the size of the air bubble relative to the amount of liquid in the bulb. Glass bulb sprinklers are widely used, relatively inexpensive, and reliable, but also do not have the capability to turn off after use.

In the category of sensing devices there are electronic temperature sensors, electronic gas sensors, and photoelectric and gas ironizations smoke detectors. Electronic sensors are thermistors, thermal resistors and transistors, which are temperature sensitive and can drive analog outputs. Electronic gas sensors require a power supply and are inexpensive, but they are prone to activation by non-hostile sources such as alcohol, after shave, or perfume. One such device is a metal oxide semiconductor responsive to a state of oxidation which can sense carbon monoxides and hydrocarbon levels or a lack of oxygen.

The photoelectric and gas ionization devices are utilized mainly in smoke detectors and also require a power supply. These devices are widely used as residential fire alarms. The photoelectric principle for these devices gives a somewhat faster response to products generated by fires of low energy (smouldering) as these fires generally produce large quantities of visible (larger particle) smoke. The smoke is detected by the photoelectric cell which then sets off the alarm. Other detectors using the ionization principle provide a faster response to fires of high energy (open flame) as these particles produce smaller smoke particles which are more easily detected. The techniques used in these detectors are not suitable for sprinklers as they cannot discriminate between the hostile or non-hostile smoke and may cause spurious activation. Further, if the sensitivity is decreased to small fires, a longer response time to all fires results. Numerous other techniques are available to provide temperature response, but they suffer from one or more of the same disadvantages.

The particular material used for a temperature responsive device should have high reliability, be cost effective, have an on/off capability and have no external requirements for electrical power or auxiliary equipment. Most of the materials and devices presently available described above suffer from a lack of one or more of these requirements. For example, ultraviolet and infrared flame detection devices sense either ultraviolet (UV) or infrared (IR) radiation given off by flames or glowing embers. Thus, these devices are line of sight devices and must be able to see the fire. They are subject to being blocked off by objects placed in front of them. Further, they are generally complex and beyond a typical user's budget in addition to requiring a power supply. Bimetallic devices such as those used in thermostats, would be suitable except that they again would require some type of electrical or mechanical drive system for opening and closing a valve. Detectors such as these using bimetallic or Nitinol comprised of a particular metallic sensing device have the desirable feature of automatic mechanical reset. However, they lack rapid positive action and are susceptable to false alarms from vibration of jarring.

Therefore it is a desirable object of the present invention to provide a thermally responsive valve which will shut off after extinguishing a fire. It is another object of the present invention to provide a thermally responsive valve utilizing magnetic elements which are highly reliable in sensing temperature variations.

Another object of the present invention is to provide a relatively low cost thermally responsive valve having magnetic elements.

Still another object of the present invention is to provide a thermally responsive valve in which the magnetic elements provide an on/off capability.

Still another object of the present invention is to provide a thermally responsive valve which does not need any electrical power or auxiliary equipment.

Yet another object of the present invention is to provide a magnetically activated thermally responsive valve suitable for use in sprinkler systems.

BRIEF DESCRIPTION OF THE INVENTION

In the design of the present invention, a valve is provided utilizing magnetic elements which provide a low-cost reliable valve having an on/off capability. Because of the latter capability, this valve is suitable for use in sprinkler systems. The valve is comprised of an open and closing mechanism operated by magnetic elements which are responsive to temperature variations. The magnetic elements are selected to be responsive to temperatures within a particular range. As temperatures rise, the magnetic elements lose their magnetic properties permitting the valve to open for extinguishing a fire, or for some other suitable purpose. When the fire is extinguished and temperatures decrease below the design temperature, the magnetic elements will regain their magnetic properties closing the valve and shutting off the flow of water.

Although the thermal response valve described above which has magnetic elements sensitive to temperature variations that automatically open or close a valve according to the temperature has a multitude of applications, a primary use is for fire control sprinkler systems. Overhead sprinkler systems are commonly utilized for fire control in industry, commercial, and residential areas and in some cases are mandated by law. Conventional sprinkler systems have proven to be better than 95% effective in controlling or extinguishing fires. However, because of their inability to automatically deactivate once the fire threat is removed, they cause substantial monetary loss in a typical fire situation, due to continuing water flow damage. In addition, should activation occur when no fire hazard is present serious water damage can occur. In the past, attempts to design on/off automatic fire sprinkler heads have relied on the use of external power, which is generally unacceptable in addition to being excessive in cost and having an unwieldy package size. The use of temperature sensitive magnetic materials provides a reliable, self-actuating opening and closing valve not requiring any external power sources and having a cost effectiveness similar to existing sprinkler heads. Additionally, the size configuration for the sprinkler head for new and retrofit construction of existing systems is consistent with existing sprinkler heads. An added benefit of the proposed system is that the individual valves can be momentarily tested manually to flush the system of rust, dirt, particles, etc. easily and conveniently. This cannot be done with any of the known conventionally available present sprinkler systems. Because the system is operated by magnetic action, operation manually is readily available to test each individual sprinkler head.

In addition, to the primary application for this invention in fire control sprinkler systems, various other uses or applications are available. For example, other applications such as use in oil cooler systems, aircraft, automotive as well as industrial/chemical processes can be perceived. Wherever a thermally responsive valve would be desirable the teachings of the present invention can be applied.

The above and other features of this invention will be fully understood from the following detailed description and the accompanying drawings, in which:

BRIEF DESCRIPTION OF THE DRAWINGS

FIG. 1 is a top view of a thermally responsive valve according to the invention;

FIG. 2 is a sectional view taken at 2—2 of FIG. 1 showing the valve in its closed position;

FIG. 3 is a sectional view similar to FIG. 2 illustrating the valve in its open position;

FIG. 4 is a top view of another embodiment of a thermally responsive valve;

FIG. 5 is a sectional view taken at 5—5 of FIG. 4 illustrating the valve of FIG. 4 in its closed position;

FIG. 6 is a sectional view similar to that of FIG. 5 showing the valve of FIG. 4 in its open position;

FIG. 7 is a top view of another embodiment of the thermally responsive valve;

FIG. 8 is a sectional view taken at 8—8 of FIG. 7 showing the valve of FIG. 7 in its closed position;

FIG. 9 is a sectional view similar to FIG. 7 showing the valve of FIG. 7 in its open position;

FIG. 10 is a sectional view of a pilot valve operated thermally responsive valve in its closed position; and FIG. 11 is a sectional view similar to FIG. 10 illustrating the valve of FIG. 10 in its open position.

DETAILED DESCRIPTION OF THE INVENTION

A thermally responsive valve suitable for use in fire sprinkling systems and other applications is illustrated generally in FIGS. 1 through 3. The valve has a main body 10 having an inlet 12 and outlet ports 14. The valve is closed by stem or poppet 16 riding in valve guide 18 retained by snap ring 34 having seal 20 engaging valve seat 22. Actuation of poppet 16 is controlled by thermally responsive magnets 24 and 26. The hex nut 28 and pipe threads 30 on the main body 10 permit easy installation of the valve in a sprinkler system. Deflector 32 permits water exiting spray ports 14 to be spread over an area.

The mutually attractive magnetic forces of thermally responsive magnets 24 and 26 keep seal 20 seated against valve seat 22, closing the valve. Whenever the temperature in the vicinity of the valve exceeds a selected design value, the magnets 24 and 26 lose their magnetic properties allowing poppet 16 to drop, opening the valve as illustrated in FIG. 3. This will allow water to flow through inlet 12 into chamber 36 out through spray ports 14 spaced around the circumference of the body. The spray will then be dispersed by deflector 32 to extinguish a fire. In the embodiment shown magnet 26 is secured to poppet 16 by a screw 38. When the fire has been extinguished and the temperature decreases below the selected design value the magnets 24 and 26 will regain their magnetic properties closing the valve.

Another embodiment is illustrated in FIGS. 4-6. In this embodiment, thermally responsive magnets 41 and 42 operate a sleeve 44 to control the flow from inlet 46 to outlet 48 through ports 50 and 52. The hex nut 54 and pipe threads 56 provide easy installation as in the previous embodiment. As long as the temperature remains below a preselected design temperature, sleeve 40 is retained in the position illustrated in FIG. 5 with seals 58 and 60 preventing communication between ports 50 and 52.

When the temperature in the vicinity of the valve exceeds the design temperature of the magnets 41 and 42 they lose their magnetic properties, allowing sleeve 40 to drop down permitting water from inlet 46 to flow through chamber 62 to manifold 64 between the sleeve and main body 66 to outlet 48.

In the embodiment illustrated in FIGS. 7-9, the main body 70 has a valve for controlling flow from an inlet 72 to outlets 74 and 76. The outlets 74 and 76 provide pipe threads for connection to deliver flow to any type of spray heads desired. A sliding valve 78 is secured to the main body 70 by a cap 80 retained by a seal 82. The seal 82 is clamped by retaining screws 84 which also secure magnet 86 to the main body.

The sliding valve has valve head 88 which seats against valve seat 90 to close inlet 72. Sliding valve 78 is held in a closed position by the magnet 86. When the temperature in the vicinity of the valve reaches the design temperature of the magnetic material forming magnet 86 the sliding valve 78 will drop, allowing water to flow through inlet 72 to outlet 74 and 76. When the temperature drops below the design temperature of the magnet 86, the sliding valve 78 will be drawn upwards seating the valve head 88 on the valve seat 90 closing the valve and shutting down flow.

The embodiment illustrated in FIGS. 10 and 11 utilizes a pilot valve to keep a main valve in a closed position. As before, the valve is comprised of a main body 92 having an inlet 94 and an outlet 96 in the form of a spray head. The outlet 96 is attached to an extension providing a water passage 98 sealed by a sliding valve 100. The sliding valve has seals 102 and 104 sealing inlet 94 from water passageway 98. The sliding valve is kept closed by a combination of sliding valve return spring 106 and water pressure applied through port 108 and pilot valve water passage 110. The combination of water pressure at inlet 94 flowing through pilot valve water passage 110 in combination with the sliding valve return spring hold the sliding valve 100 against the valve seat 112, preventing flow to water passage 98. The pilot valve is sealed by a check ball 114 and check ball seat retained in a cage 118. A temperature responsive magnetic material 120 surrounding the check ball cage 118 holds check ball 114 against check ball seat 116, preventing flow to pilot valve outlets 122. The pilot valve control thermal responsive valve of FIGS. 10 and 11 also has pipe threads 124 and hex nut 126 for easy attachment to a sprinkler system as before.

Whenever the temperature in the vicinity of the valve exceeds the design temperature of the magnetic material forming magnet 120, check ball 114 will drop downward allowing water pressure in the pilot valve water passage 110 to flow out through pilot valve water outlets 122 reducing the pressure on sliding valve 100. The pressure at the water inlet 94 will then force the sliding valve downward as illustrated in FIG. 11, connecting outlet 96 in communication with the inlet through water passage 98. As the magnet 120 cools, the ball 114 will be drawn upwards against the check ball seat 116 closing the pilot valve which will again change the pressure differential causing valve 100 to close.

In all the embodiments shown the thermally responsive valve has the common component of magnetic forces to hold the valve in a closed position. The magnetic forces are supplied by materials that have strong magnetic properites up to a specific temperature. When the preselected design temperature is exceeded, the material will abruptly lose its magnetic properties (permeability) and will become magnetically inert. This allows the valve to open. When the material cools to its design temperature and below, it abruptly regains its magnetic properties closing the valve. Of the materials suitable for use in the magnet, one class of materials is known as thermal ferrites. Particularly suitable within this class of materials is a nickel zinc ferrite which can be formulated to have temperature responsive points in the range of $-40°$ centigrade to $300°$ centigrade. Most fire protection applications (i.e., sprinkler systems) will require a response in the area of $60°$ centigrade ($140°$ farenheit). The thermal ferrites are particularly suitable as they can be recycled indefinitely without appreciable loss of magnetic force and do not deteriorate with time. Nickel zinc ferrite in particular has a transition point range of plus or minus two degrees centigrade.

Ferrites are chemically inert, and therefore are not subject to change with time or ambient conditions. Some magnetic properties of nickel zinc ferrite, such as initial permeability undergo an abrupt discontinuous change at the Curie Point. The Curie Point of a material can be controlled to be within plus or minus two degrees centigrade within a temperature range of $-40°$ centigrade to $300°$ centigrade by control of the chemical composition and the manufacturing process. A typical nickel zinc ferrite having the requisite physical properties would be:

Thermal conductivity of 0.015 cal/sec-cm-deg;
Heat capacity of 2 cal/g-deg;
Volume resistivity of $10^7$ ohm/cm
Density of 4.9.

Thus there has been disclosed a magnetically controlled thermally responsive valve suitable for use in fire responsive sprinkling systems. Other applications of the valve can be envisioned where the opening and closing of a valve is responsive to temperature variations.

This invention is not to be limited by the embodiments shown in the drawings and described in the description which are given by way of example and not of limitation, but only in accordance with the scope of the appended claims.

I claim:
1. A sprinkler valve for use in fire extinguishing systems comprising:
   a valve housing having an inlet, an outlet and a passageway connecting said inlet and outlet;
   connecting means connecting said inlet to a water supply system;
   spray nozzle means connected to said outlet for spraying water supplied to said sprinkler valve;
   flow interrupting means for interrupting the flow of water through said passageway from said inlet to said outlet;
   magnetically attractive material on said flow interrupting means;
   thermally responsive magnetic means mounted on an external portion of said valve housing exposed to ambient air cooperating with said magnetically attractive material on said interrupting means to open or close said passageway;
   said thermally responsive magnetic means being constructed of a material which loses its magnetic permeability at a preselected temperature;
   said magnetically attractive material on said flow interrupting means being magnetically attracted to said thermally responsive magnetic means so that said passageway is normally closed preventing the flow of water to said outlet;
   said thermally responsive magnetic means losing its magnetic attraction at said preselected temperature caused by external heat from a fire proximate said valve;

whereby said valve opens at or above said preselected temperature permitting water to be distributed from said nozzle connected to said outlet to extinguish said fire, said valve closing when fire is extinguished and the temperature proximate said valve falls below said preselected temperature to shut off said valve.

2. The valve according to claim 1 in which said flow interrupting means comprises; a valve seat in said passageway; a valve stem movable into and out of abutment with said valve seat to open and close said passageway; said thermally responsive magnetic means constructed and arranged to operate said valve stem.

3. The valve according to claim 1 in which said valve stem is comprised of a magnetically attractive material; said thermally responsive magnetic means being mounted to attract said valve stem holding it in abutment against said valve seat.

4. The valve according to claim 3 in which said thermally responsive magnetic means is comprised of a ring of magnetic material surrounding said valve stem whereby said stem is held in abutment with said seat.

5. The valve according to claim 1 in which said flow interruption means comprises: ports respectively connected to said inlet and said outlet; connecting means for connecting and disconnecting said ports; said thermal responsive magnetic means constructed and arranged to operate said connecting means.

6. The valve according to claim 5 in which said connecting means comprises a sleeve slidably mounted on a housing forming a part of said valve; said ports being formed in said housing; said sleeve disconnecting said ports in a first position and connecting said ports in a second position; said thermally responsive magnetic means holding said sleeve in said first position.

7. The valve according to claim 6 in which said thermally responsive magnetic means comprises a thermally responsive magnet on said sleeve; mutually attractive magnetic means on said housing whereby said sleeve is held in a position with said ports disconnected.

8. The valve according to claim 7 in which said mutually attractive magnetic means comprises a thermally responsive magnet mounted on said housing.

9. The valve according to claim 1 in which said valve includes: a valve seat; a sliding valve body; biasing means biasing said valve body into abutment with said valve seat; fluid pressure means applying fluid pressure to said sliding valve body to assist said biasing means in holding said valve body in abutment with said valve seat; pressure relief means for relieving the pressure applied by said fluid pressure means; thermally responsive magnetic means constructed and arranged to operate said fluid pressure relief means; whereby when said pressure is relieved said valve body is displaced by the pressure on said inlet causing fluid flow from said inlet to said outlet.

10. The valve according to claim 9 in which said fluid pressure means comprises an auxiliary fluid passage connecting said inlet to said valve body to assist in holding said valve body in abutment with said valve seat.

11. The valve according to claim 10 in which said pressure relief means comprises a ball valve whereby when said ball valve is closed said fluid pressure means applies fluid pressure to hold said sliding valve in a closed position and when said ball valve is closed said fluid pressure on said sliding body is relieved whereby said valve is opened.

12. The valve according to claim 11 in which said thermally responsive magnetic means is constructed and arranged to hold the ball in said ball valve means in a closed position.

13. The valve according to claim 12 in which said thermally responsive magnetic means comprises a ball in said ball valve means constructed of a magnetically attractive material; thermal responsive magnetic means juxtaposed adjacent to said ball means whereby the mutual magnetic forces between said ball and said thermal responsive magnetic means holds said ball valve in a closed position.

14. The valve according to claim 13 in which said thermally responsive magnetic means surrounds said ball valve means.

* * * * *